United States Patent [19]
Snelling et al.

[11] Patent Number: 5,668,439
[45] Date of Patent: Sep. 16, 1997

[54] HIGH VOLTAGE POWER SUPPLY

[75] Inventors: Christopher R. Snelling, Penfield; John S. Facci; Michael J. Levy, both of Webster; Dale R. Mashtare, Macedon; Michael S. Smith, Penfield, all of N.Y.

[73] Assignee: Xerox Corporation, Stamford, Conn.

[21] Appl. No.: 538,659

[22] Filed: Oct. 3, 1995

[51] Int. Cl.$^6$ ...................................................... H01L 41/08
[52] U.S. Cl. ........................ 310/339; 310/319; 310/800; 399/175
[58] Field of Search ................................ 310/339, 800, 310/319, 330, 332; 355/219, 4; 361/225

[56] References Cited

U.S. PATENT DOCUMENTS

| | | | |
|---|---|---|---|
| 2,646,610 | 7/1953 | Williams | 310/357 X |
| 3,539,841 | 11/1970 | Riff | 310/339 |
| 4,389,445 | 6/1983 | Yoshida et al. | 310/800 X |
| 4,403,848 | 9/1983 | Snelling | 355/4 |
| 4,404,490 | 9/1983 | Taylor et al. | 310/339 |
| 4,504,761 | 3/1985 | Triplett | 310/800 |
| 4,833,503 | 5/1989 | Snelling | 310/800 X |
| 4,843,275 | 6/1989 | Radice | 310/334 |
| 5,034,648 | 7/1991 | Gastgeb | 310/330 |
| 5,504,383 | 4/1996 | Facci et al. | 310/339 |
| 5,512,795 | 4/1996 | Epstein et al. | 310/339 |

FOREIGN PATENT DOCUMENTS 699590  11/1979  U.S.S.R. .

*Primary Examiner*—Mark O. Budd
*Attorney, Agent, or Firm*—Lloyd F. Bean, II

[57] ABSTRACT

A power supply for transmitting voltage to a device, including a web having a piezoelectric exterior layer for generating a voltage on the surface thereof in response to being deformed. The web is entrained about a roller arrangement to deform the piezoelectric exterior layer. Commutation brushes transfers the voltage generated on the surface of the piezoelectric exterior layer to the device. The roller arrangement in combination with the placement of commutation brushes and neutralization brushes are used to adjust the voltage to the device.

13 Claims, 7 Drawing Sheets

HIGH VOLTAGE POWER SUPPLY

The present invention relates generally to a power supply primarily for use in reproduction systems of the xerographic, or dry copying, more particularly, concerns a power supply for supplying high voltage at low current levels to charging devices.

Cross-reference is made to co-pending U.S. patent application Ser. No. 08/344,916 (attorney docket no. D/94344), entitled"HIGH VOLTAGE POWER SUPPLY" assigned to the assignee hereof.

Generally, the process of electrostatographic copying is initiated by exposing a light image of an original document onto a substantially uniformly charged photoreceptive member. Exposing the charged photoreceptive member to a light image discharges a photoconductive surface thereon in areas corresponding to non-image areas in the original document while maintaining the charge in image areas, thereby creating an electrostatic latent image of the original document on the photoreceptive member. This latent image is subsequently developed into a visible image by depositing charged developing material onto the photoreceptive member such that the developing material is attracted to the charged image areas on the photoconductive surface. Thereafter, the developing material is transferred from the photoreceptive member to a copy sheet or to some other image support substrate to create an image which may be permanently affixed to the image support substrate, thereby providing an electrophotographic reproduction of the original document. In a final step in the process, the photoconductive surface of the photoreceptive member is cleaned to remove any residual developing material which may be remaining on the surface thereof in preparation for successive imaging cycles.

The electrostatographic copying process described hereinabove is well known and is commonly used for light lens copying of an original document. Analogous processes also exist in other electrostatographic printing applications such as, for example, digital laser printing where a latent image is formed on the photoconductive surface via a modulated laser beam, or ionographic printing and reproduction where charge is deposited on a charge retentive surface in response to electronically generated or stored images.

As discussed above, in electrostatographic reproductive devices it is necessary to charge a suitable photoconductive or reproductive surface with a charging potential prior to the formation thereon of the light image. Various devices have been proposed for the application of the electrostatic charge or charge potential to the photoconductive insulating body of Carlson's invention; one method of operation employs, for charging the photoconductive insulating layer, a form of corona discharge wherein an adjacent electrode comprising one or more fine conductive bodies maintained at a high electric potential causes deposition of an electric charge on the adjacent surface of the photoconductive body. Examples of such corona discharge devices are described in U.S. Pat. No. 2,836,725, to R. G. Vyverberg and U.S. Pat. No. 2,922,883, to E. C. Giamio, Jr. In practice, one corotron (corona discharge device) may be used to charge the photoconductor before exposure and another corotron used to charge the copy sheet during the toner transfer step. Corotrons are cheap, stable units, but they are sensitive to changes in humidity and the dielectric thickness of the insulator being charged. Thus, the surface charge density produced by these devices may not always be constant or uniform.

The operation of transferring developing material from the photoreceptive member to the image support substrate is realized at a transfer station. In a conventional transfer station, transfer is achieved by applying electrostatic force fields in a transfer region sufficient to overcome forces holding the toner particles to the surface of the photoreceptive member. These electrostatic force fields operate to attract and transfer the toner particles over to the copy sheet or other image support substrate. Typically, transfer of toner images between support surfaces is accomplished via electrostatic attraction using a corotron or other corona generating device. In such corona induced transfer systems, the surface of the image support substrate is placed in direct contact with the toner image while the image is supported on the photoreceptive member. Transfer is induced by "spraying" the back of the support substrate with a corona discharge having a polarity opposite that of the toner particles, thereby electrostatically attracting the toner particles to the sheet. An exemplary corotron ion emission transfer system is disclosed in U.S. Pat. No. 2,836,725.

Toner transfer and charging has also been accomplished successfully via biased roll transfer systems. This type of transfer apparatus was first described by Fitch in U.S. Pat. No. 2,807,233, which disclosed the use of a metal roll coated with a resilient coating having an approximate resistivity of at least $10^6$ ohm-cm, providing a means for controlling the magnetic and non-magnetic forces acting on the toner particles during the transfer process. Bias roll transfer has become the transfer method of choice in many state-or-the-art xerographic copying systems and apparatus, as can be found, for example, in the Model 9000 Series of machines manufactured by Xerox Corporation. Notable examples of bias roll transfer systems are described in U.S. Pat. No. 3,702,482 by C. Dolcimacsolo et al, and U.S. Pat. No. 3,782,205, issued to T. Meagher. Other general examples of bias roll transfer systems can be found in U.S. Pat. Nos. 3,043,684; 3,267,840; 3,328,193; 3,598,580; 3,525,146; 3,630,591, 3,684,364; 3,691,992; 3,832,055; and 3,847,478, among others.

Hereinbefore, transfer and charging systems have required sources of high voltage at low current levels for charging reproductive surface with a charging potential prior to the formation thereon of the latent image, and thereafter maintaining the same pattern and intensity of electrostatic fields for charging as on the latent image being reproduced to induce transfer onto a copy sheet. This requirement has been usually met by incorporating high voltage power supplies for feeding the coronas and bias rolls which perform such processes as precharge, charge development and transfer. These high voltage power supplies have added to the overall cost and weight of electrophotographic printers.

A simple, relatively inexpensive, and accurate approach to eliminating the expense and weight of traditional high voltage sources in such printing systems has been a goal in the design, manufacture and use of electrophotographic printers. The need to provide accurate and inexpensive transfer and charging systems has become more acute, as the demand for high quality, relatively inexpensive electrophotographic printers has increased.

SUMMARY OF THE INVENTION

Pursuant to an aspect of the invention there is provided a power supply for transmitting voltage to a device, including a web having a piezoelectric exterior layer for generating a voltage on the surface thereof in response to being deformed; a member for deforming the web; means for transferring the voltage generated on the surface of the piezoelectric exterior layer to the device; and means for adjusting the voltage to the device.

BRIEF DESCRIPTION OF THE DRAWINGS

These and other aspects of the present invention will become apparent from the following description in conjunction with the accompanying drawings, in which.

Figure 1:
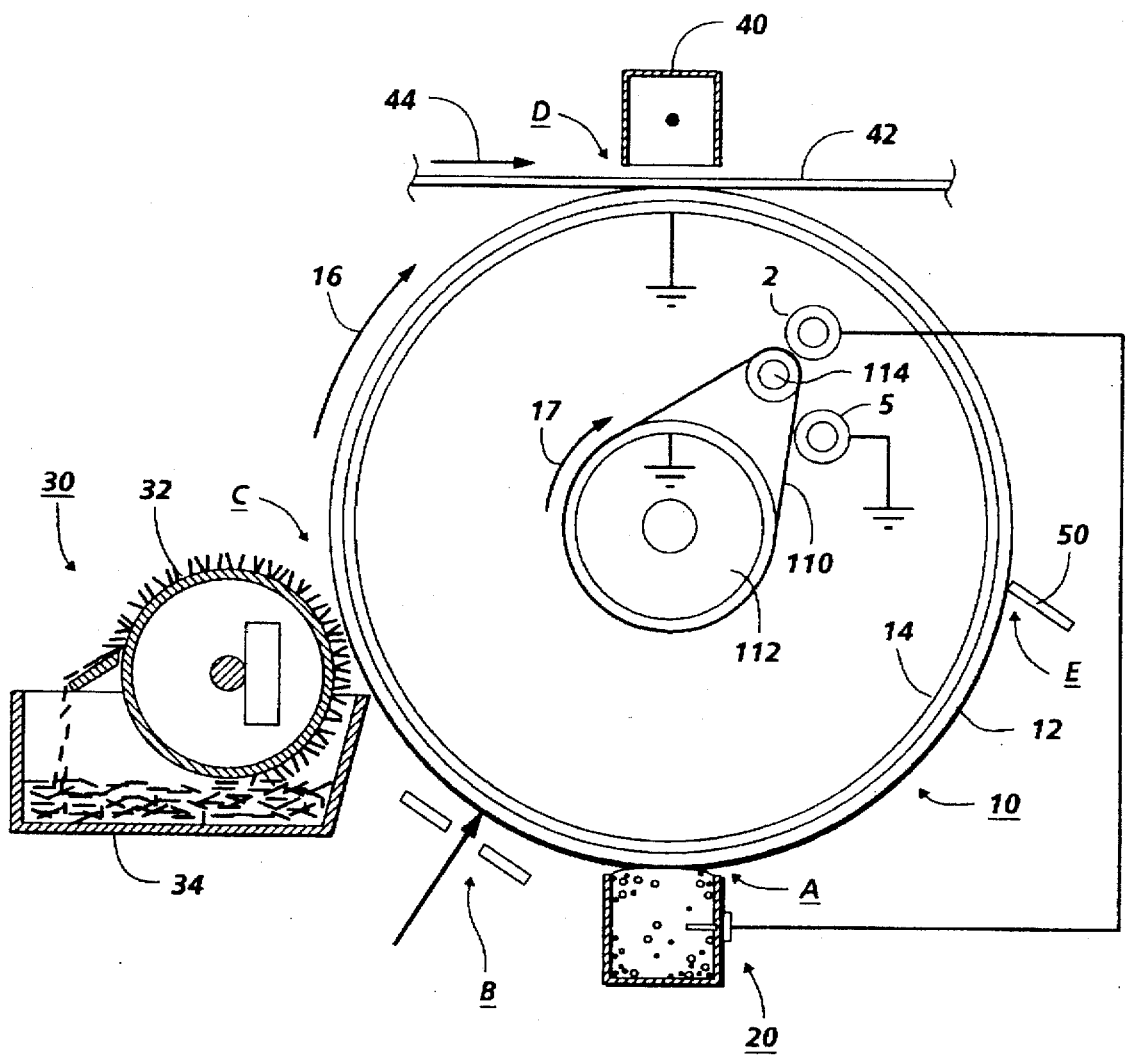
FIG. 1 illustrates the power supply of the present invention in a typical electrostatographic printing machine.

As indicated hereinabove, the present invention provides a novel power supply for use in an electrostatographic printing machine. While the present invention will be described with reference to a preferred embodiment thereof, it will be understood that the invention is not limited to this preferred embodiment. On the contrary, it is intended that the present invention cover all alternatives, modifications, and equivalents as may be included within the spirit and scope of the invention as defined by the appended claims. Other aspects and features of the present invention will become apparent as the description proceeds.

Referring now to the drawings, where the showings are for the purpose of describing a preferred embodiment of the invention and not for limiting same, the various processing stations employed in the reproduction machine illustrated in FIG. 1 will be described only briefly. It will no doubt be appreciated that the various processing elements also find advantageous use in electrophotographic printing applications from an electronically stored original.

The exemplary electrophotographic reproducing apparatus of FIG. 1 employs a drum 10 including a photoconductive surface 12 deposited on an electrically grounded conductive substrate 14. A motor (not shown) engages with drum 10 for rotating the drum 10 to advance successive portions of photoconductive surface 12 in the direction of arrow 16 through various processing stations disposed about the path of movement thereof, as will be described.

Initially, a portion of drum 10 passes through charging station A. At charging station A, indicated generally by reference numeral 20, charges the photoconductive surface 12 on drum 10 to a relatively high, substantially uniform potential. This charging device will be described in detail hereinbelow.

Once charged, the photoconductive surface 12 is advanced to imaging station B where an original document (not shown) is exposed to a light source for forming a light image of the original document which is focused onto the charged portion of photoconductive surface 12 to selectively dissipate the charge thereon, thereby recording an electrostatic latent image corresponding to the original document onto drum 10. One skilled in the art will appreciate that a properly modulated scanning beam of energy (e.g., a laser beam) may be used to irradiate the charged portion of the photoconductive surface 12 for recording the latent image thereon.

After the electrostatic latent image is recorded on photoconductive surface 12, drum 10 is advanced to development station C where a magnetic brush development system, indicated generally by the reference numeral 30, deposits developing material onto the electrostatic latent image. The magnetic brush development system 30 includes a single developer roller 32 disposed in developer housing 34. Toner particles are mixed with carrier beads in the developer housing 34, creating an electrostatic charge therebetween which causes the toner particles to cling to the carrier beads and form developing material. The developer roller 32 rotates to form a magnetic brush having carrier beads and toner particles magnetically attached thereto. As the magnetic brush rotates, developing material is brought into contact with the photoconductive surface 12 such that the latent image thereon attracts the toner particles of the developing material, forming a developed toner image on photoconductive surface 12. It will be understood by those of skill in the art that numerous types of development systems could be substituted for the magnetic brush development system shown herein.

After the toner particles have been deposited onto the electrostatic latent image for development thereof, drum 10 advances the developed image to transfer station D, where a sheet of support material 42 is moved into contact with the developed toner image via a sheet feeding apparatus (not shown). The sheet of support material 42 is directed into contact with photoconductive surface 12 of drum 10 in a timed sequence so that the developed image thereon contacts the advancing sheet of support material 42 at transfer station D. A charging device 40 is provided for creating an electrostatic charge on the backside of sheet 42 to aid in inducing the transfer of toner from the developed image on photoconductive surface 12 to a support substrate 42 such as a sheet of paper. While a conventional coronode device is shown as charge generating device 40, it will be understood that the various charging device as discussed supra, can be substituted for the corona generating device 40 for providing the electrostatic charge which induces toner transfer to the support substrate materials 42. The support material 42 is subsequently transported in the direction of arrow 44 for placement onto a conveyor (not shown) which advances the sheet to a fusing station (not shown) which permanently affixes the transferred image to the support material 42 creating a copy or print for subsequent removal of the finished copy by an operator.

Invariably, after the support material 42 is separated from the photoconductive surface 12 of drum 10, some residual developing material remains adhered to the photoconductive surface 12. Thus, a final processing station, namely cleaning station E, is provided for removing residual toner particles from photoconductive surface 12 subsequent to separation of the support material 42 from drum 10. Cleaning station F can include various mechanisms, such as a simple blade 50, as shown, or a rotatably mounted fibrous brush (not shown) for physical engagement with photoconductive surface 12 to remove toner particles therefrom. Cleaning station F may also include a discharge lamp (not shown) for flooding the photoconductive surface 12 with light in order to dissipate any residual electrostatic charge remaining thereon in preparation for a subsequent imaging cycle. As will be described, the present invention may also be utilized as a substitute for such a discharge lamp to counter any residual electrostatic charge on the photoconductive surface 12.

The foregoing description should be sufficient for purposes of the present application for patent to illustrate the general operation of an electrophotographic reproducing apparatus incorporating the features of the present invention. As described, an electrophotographic reproducing apparatus may take the form of any of several well known devices or systems. Variations of the specific electrostatographic processing subsystems or processes described herein may be expected without affecting the operation of the present invention.

Figure 2:
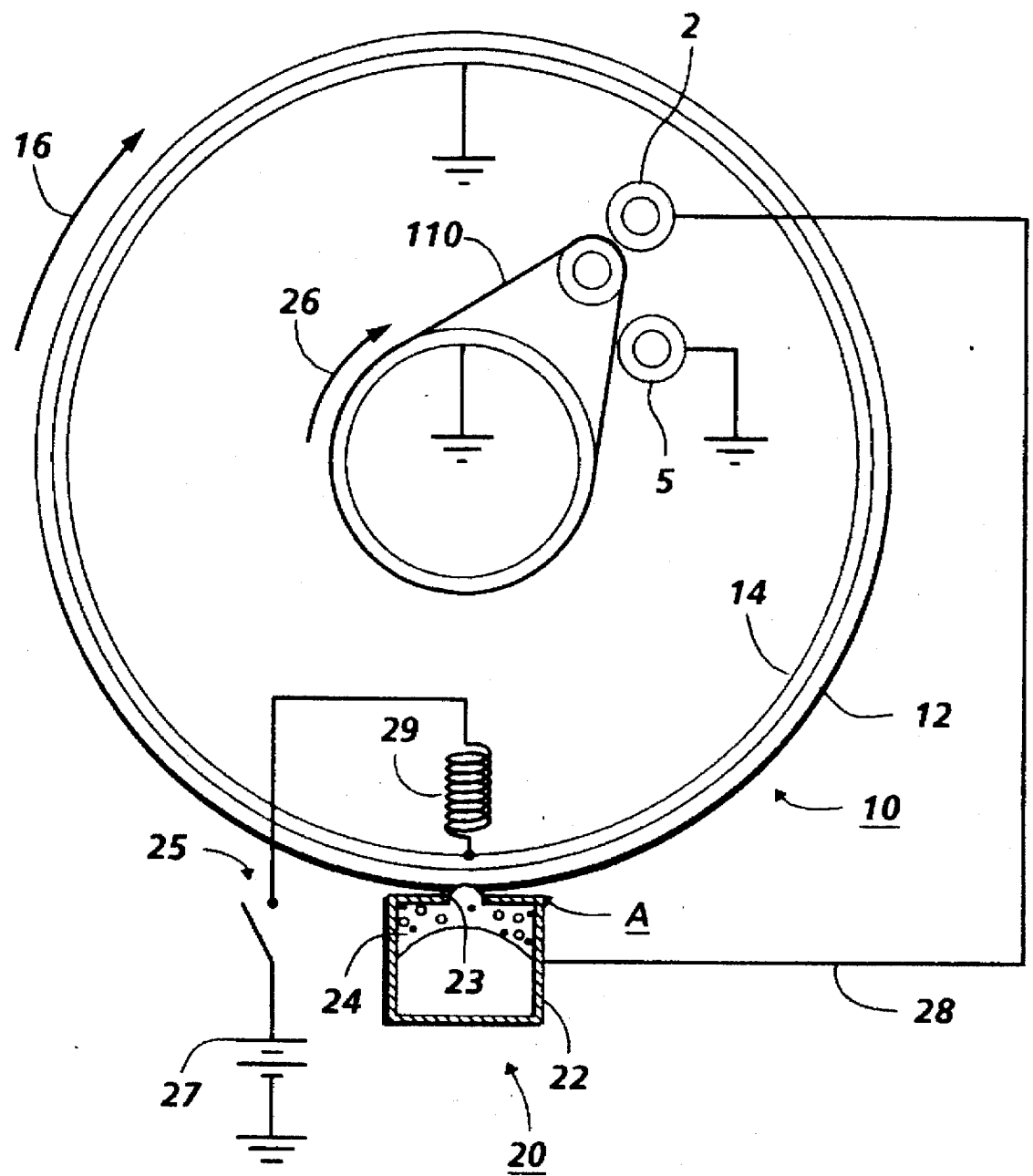
FIG. 2 illustrates an enlarged view of power supply of the present invention.
Figure 3:
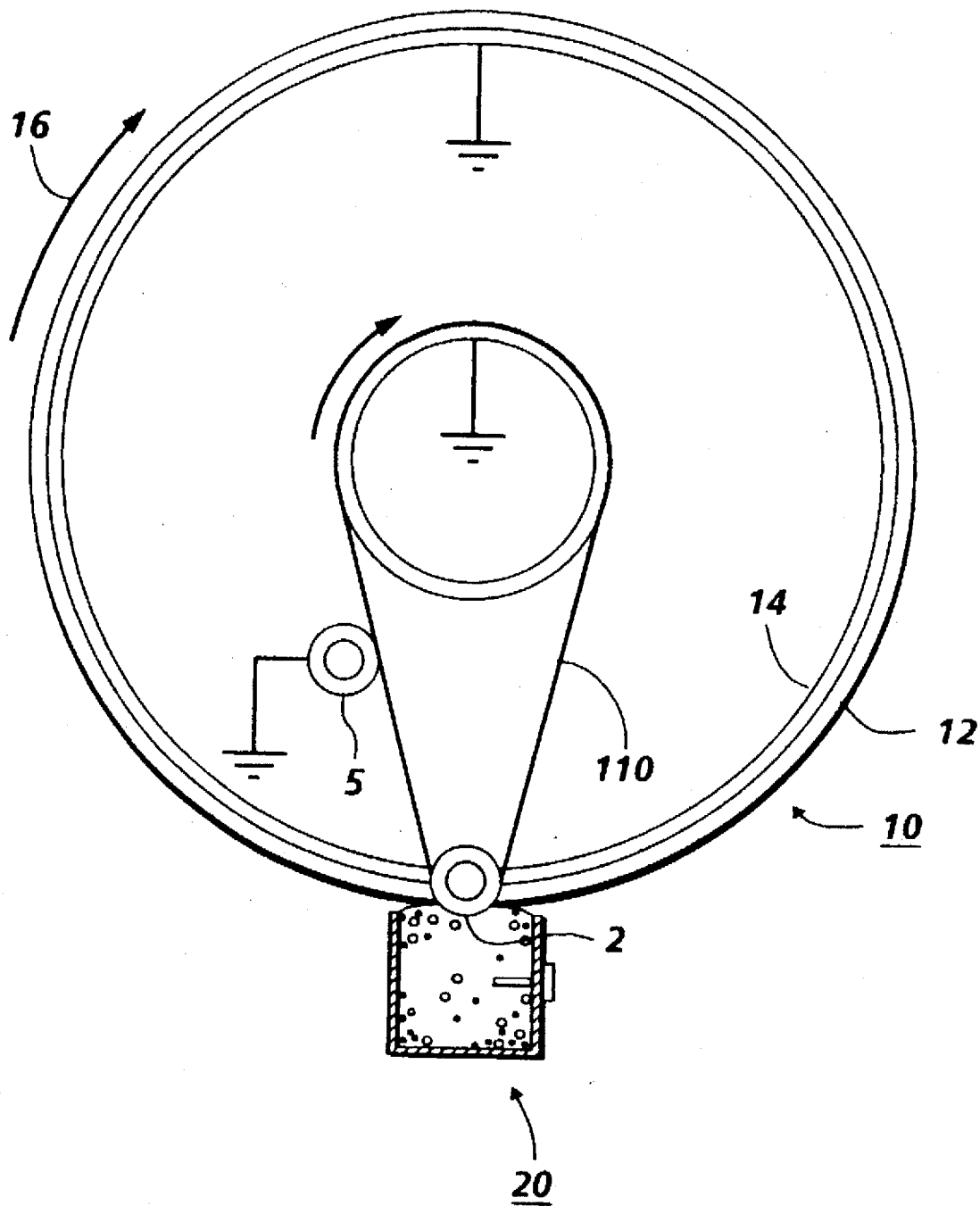
FIGS. 3 illustrates a second embodiment of the present invention.

Referring now more particularly to FIGS. 2 and 3 and to the specific subject matter of the present invention, preferably, charging device 20 is an ionomorphic charging device as disclosed in ferrofluid media charging of photoreceptors, U.S. application Ser. No. 08/250,090. The primary components of the fluid media charging structure 20 are a fluid reservoir 22 for placing the fluid media 24 in contact with the photoconductive surface 12 of the drum 10, and a voltage power supply 26 of the present invention coupled to the fluid reservoir 22 for applying a DC voltage bias to the fluid media 24.

In the embodiment of FIG. 2, the fluid reservoir 22 comprises a simple beaker or other vessel for containing an ionically conductive fluid media 24. A conductor 28, such as a copper wire, is coupled to a voltage power supply 26 of the present invention and is contacted with the fluid media 24 in order to apply an ion producing bias voltage to the fluid media 24. Contact between the fluid media 24 and the conductor 28 may be facilitated by a conductive nipple 23 extending into fluid reservoir 22 and capable of being coupled to conductor 28. Alternatively, the fluid reservoir 22 may include a container fabricated of brass, stainless steel or any other conductive material or conductive composite materials such as a carbon loaded polymer or plastic, wherein a conductor is merely placed in contact with the fluid reservoir (as shown in FIG. 2) in order to apply a voltage bias to the fluid media. The conductivity of this conductive fluid reservoir can be as low as about 2 nanomho/cm. Thus, electrical contact can be made to the ionically conductive fluid either by immersing a wire or other electrical contact element into the fluid if the fluid reservoir 22 is made of an electrically insulating material (as shown in FIG. 1), or by applying a biasing voltage directly to the fluid container if the fluid reservoir 22 is made of a conductive material (as shown in FIG. 2).

Examples of ionically conductive liquid which may serve as the fluid media 24 include any liquid based material capable of conduction of ions, including simple tap water and even distilled deionized water (the conductivity thereof believed to be caused by the known dissolution of carbon dioxide in water). Components which can be added to the water to render it more ionically conductive include atmospheric carbon dioxide ($CO_2$), lithium carbonate, sodium carbonate, potassium carbonate, sodium bicarbonate and the like. The concentration ranges can vary from trace levels to saturation. Another example of an ionically conductive medium is a gel that is composed of 4 wt % acrylic acid neutralized with NaOH containing 96 wt % water. Numerous other fluid compounds and materials which may be desirable for use and are described in commonly assigned U.S. patent application Ser. No. 08/250,749.

The ionically conductive fluid may be contacted to the imaging member in several ways. The fluid itself may be directly contacted with the photoreceptor surface by merely filling the fluid reservoir 22 to its maximum capacity such that a meniscus is formed just above the upper perimeter of the fluid reservoir 22, allowing the fluid media 24 to impinge upon the surface of the photoreceptor through an opening in the container reservoir. In this embodiment, selective contact between the fluid media and the photoreceptor surface may be accomplished by selectively positioning the reservoir into and out of close proximity with the photoreceptor.

Numerous alternative means for contacting the fluid media to the photoreceptor may also be contemplated. One such alternative will be discussed in greater detail with respect to FIG. 2, wherein the fluid media 24 includes a ferrofluid of the type which exhibits an internal magnetic moment which can be spontaneously organized in a common direction under the influence of magnetic fields such that the position of the ionic conductive fluid media can be controlled via magnetic fields. In this alternative embodiment, the fluid media 24 comprises a ferrofluid material which is located within a reservoir having a small opening or aperture 23, wherein the aperture 23 is positioned opposite the imaging member 10. Preferably aperture 23 is provided in the form of a small slit which serves to confine the area of contact between the fluid media and the photoreceptor, and also serves to minimize the evaporation of the fluid from the reservoir. A magnet 29 is provided in the vicinity of the reservoir for controlling the position of the ferrofluid. In the illustrated embodiment, an electromagnet coupled to a biasing source 27 via switch 25 is positioned external to the reservoir 22 positioned opposite the aperture 23, separated from the reservoir 22 by the imaging member 10. With switch 25 closed, the electromagnet 29 is activated so as to cause the ferrofluid to be attracted toward the top of the reservoir 22 where the fluid exits through the aperture 23 in the reservoir 22. As should be understood from the foregoing discussion, the application of a voltage to the ferrofluid causes ions to be transferred to the imaging surface.

As indicated hereinabove, a voltage bias is applied to the fluid media in the fluid reservoir 22 via power supply 26 of the present invention. Typical voltages applied to the fluid media might range from about −4000V to about −4000V, preferably between about ±400 to about ±700, and more preferably ranging from about −600 to about −675 volts. The voltage that is applied to the imaging member is essentially equal to the voltage applied to the fluid media such that a voltage of 750 volts, for example, applied to the ionically conductive medium results in a voltage of about 750 volts or slightly less on the imaging member. The voltage applied to the fluid media 24 by the power source 26 can be of a positive polarity or a negative polarity wherein the polarity of the charge which is deposited is exclusively controlled by the polarity of the voltage which is applied. The application of a positive bias to the ionically conductive fluid medium 24 causes positive ions to transfer to the imaging member while application of a negative bias to the ionically conductive fluid medium 24 causes negative ions to transfer to the imaging member.

Referring to FIGS. 1 and 2, the power supply of the present invention consists of belt 110 which is entrained about tension roller 114 and drive roller 112. Drive roller 112 is coupled to a motor (not shown) by suitable means such as a drive shaft. Belt 110 is maintained in tension by a pair of springs (not shown) resiliently urging tension roller 114 against belt 110 with the desired spring force. Tension roller 114 is rotatably mounted and rotates freely as belt 110 moves in the direction of arrow 17. Belt 110 comprises a peripheral surface layer 14 of a piezoelectric polymer film, such as polyvinylidene fluoride (PVDF) film, preferably Kynar® film manufactured by Pennwalt KTM, and preferably the belt is aluminized on the inside.

Figure 4:
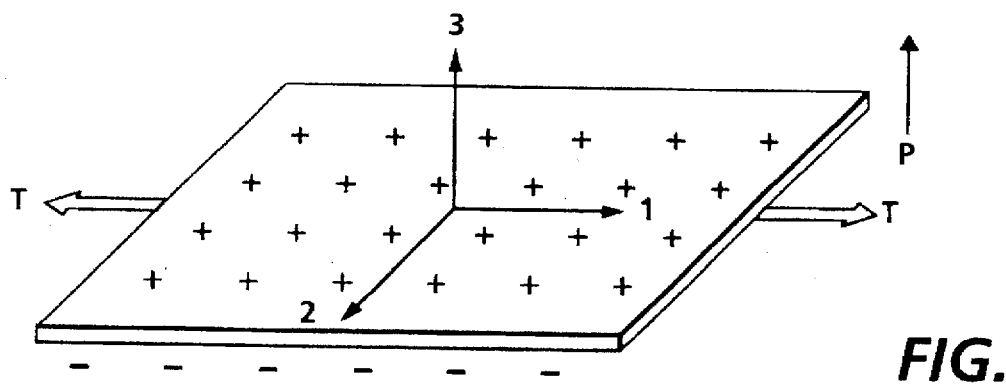
FIG. 4 illustrates the geometry of a piezoelectric sheet.

PVDF materials are formed by stretching the film in one direction, and applying a large electric field to electrically polarize it in a direction perpendicular to the film. In FIG. 4, the stretch direction is denoted by "1" and the polarization direction is denoted by "3". When a PVDF sheet is strained, it develops an internal electric field which is proportional to the deformation.

Figure 5:
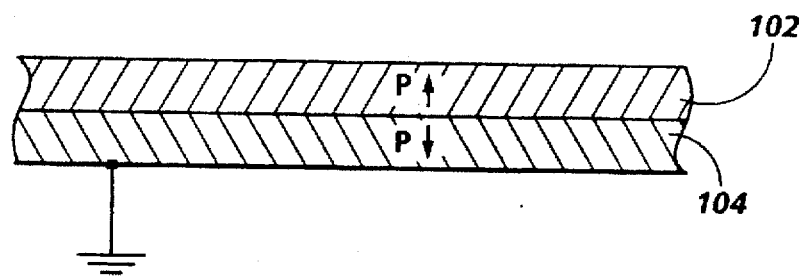
FIG. 5 illustrates a Xeromorph (bimorph) sheet which is utilized by the present invention.
Figure 6:
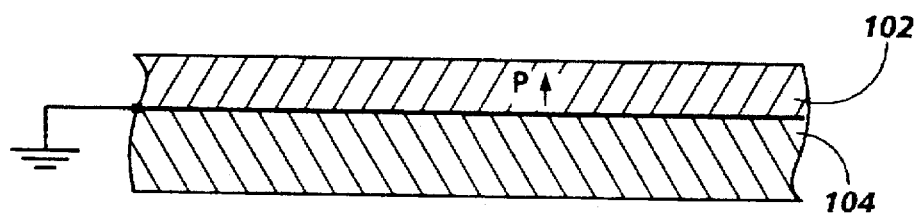
FIG. 6 illustrates a Xeromorph (unimorph) sheet which is utilized by the present invention.

The present invention utilizes either a bimorph or a unimorph structure referred to as a "Xeromorph". A bimorph Xeromorph consists of two PVDF sheets 102 and 104 laminated together with each sheet polarization direction opposed to each other having only a bottom electrode, as shown in FIG. 5. A unimorph Xeromorph consists of a single PVDF sheet 102 laminated to a thick substrate 106 as shown in FIG. 6. The substrate material may comprise materials which can be bent, and have no piezoelectric properties.

Belt 110 is sufficiently elastic and resilient to deform around roller 114. As belt 110 deforms around the radius of tension roller 114 an electric potential is generated on the surface of belt 110 in the nip region formed between conductive member 2 and belt 110. When the PVDF is passed over the smaller roller, the film is placed in tension on the outer surface and in compression on the inner surface. A high voltage (800–1500V) is thus generated as the film is bent around the tight radius of the small roller. This voltage is commutated by conductive member 2 and then fed to charging device 20 by wire 28.

It has been found that open-circuit voltage is only slightly belt speed dependent and is independent of area. Current generation is both belt speed and charge-area dependent. If desired higher current can be achieved by increases the belt speed and increases the are covered by the neutralization and commutation brushes.

Several types of neutralization and commutation brushes can be employed with the present invention to maximize generated charge commutation. Brushes constructed of conductive foam, various thicknesses of conductive rubber, and "mouse" fibers.

A power supply of the present invention was also used in conjunction with a liquid ionic charging system. It was found that the present invention can charge 2 mil mylar up to an average of –1250 V (xeromorph belt speed of 8.5 ips, mylar belt speed of 2 ips). As well, the placement of a 540 pF capacitor in parallel with 1370 V zener diode substantially reduced the effect of the seam region on the voltage provided. It is suggested here, however, that an angled seam or seamless configuration will eliminate the "voltage spikes" currently seen since a constant amount of charge will be removed throughout the belt cycle.

Figure 9:
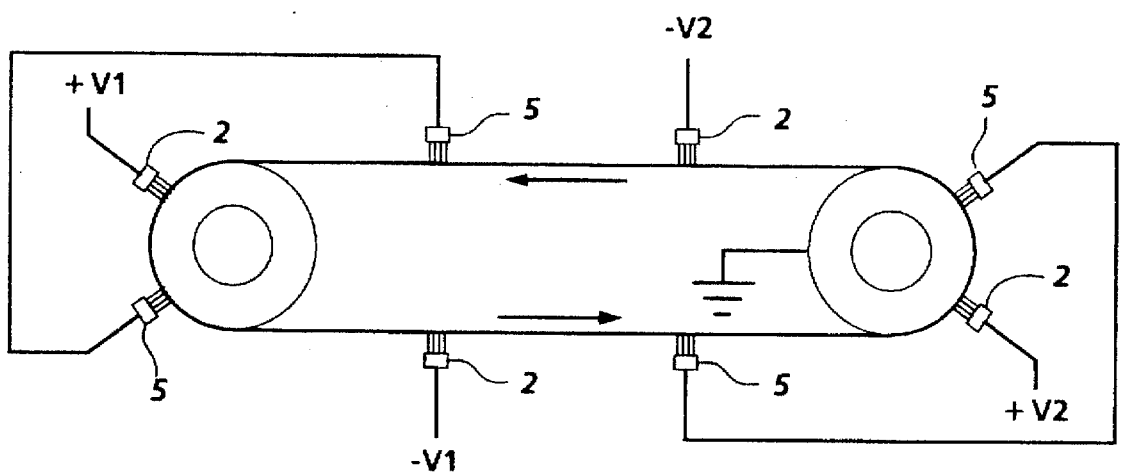
FIG. 9 illustrates dual voltage doubler.
Figure 10:
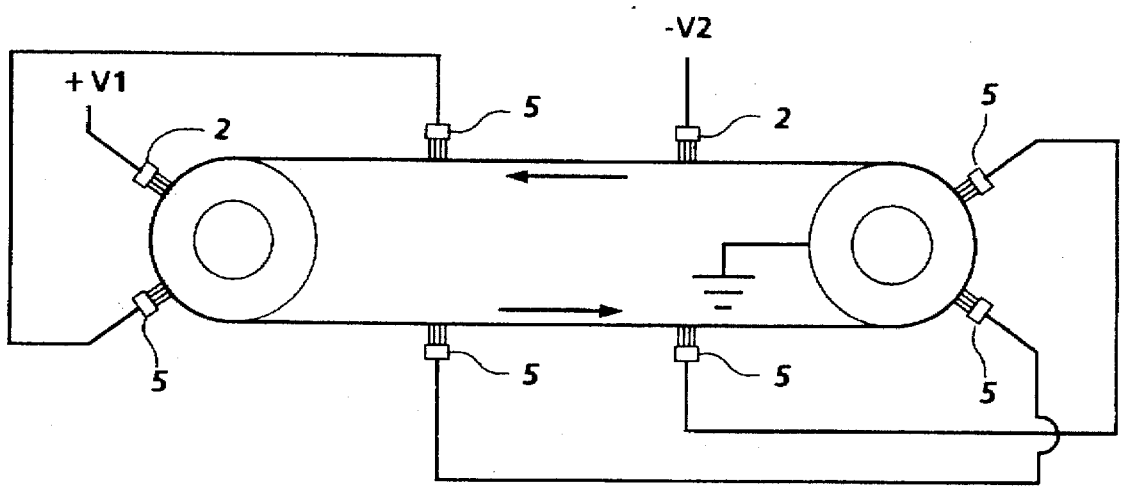
FIG. 10 illustrates voltage quadruplar.
Figure 11:
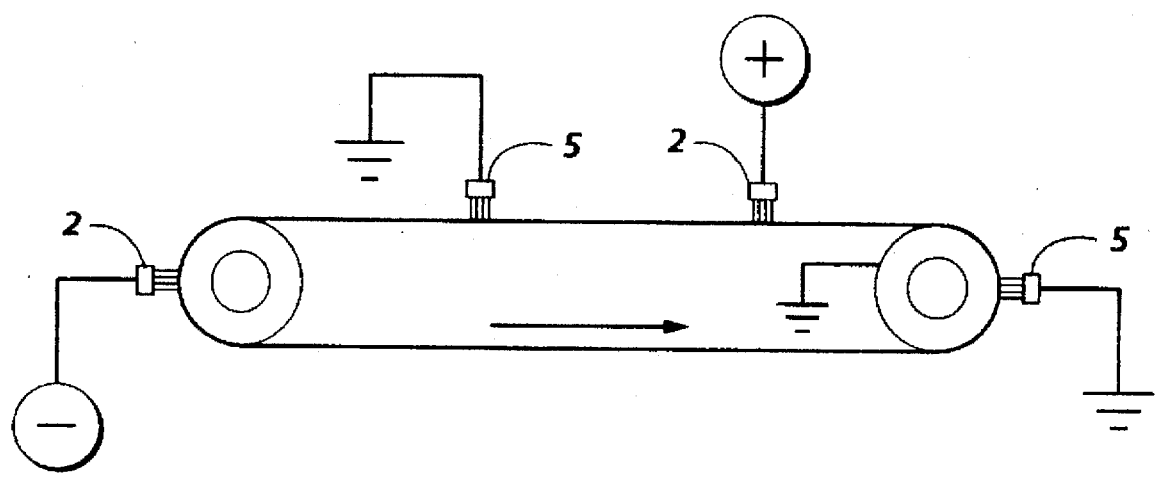
FIG. 11 illustrates dual polarity mode.
Figure 12:
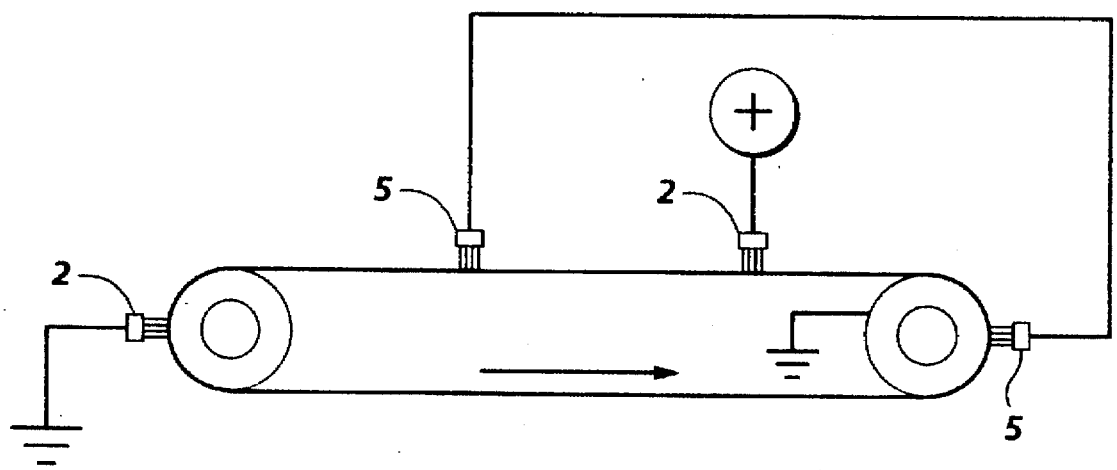
FIG. 12 illustrates doubled voltage setup.

It has been found that xeromorph power supply current production is directly proportional to commutation brush length. It is believed that a longer brush can commutate more of the charge accumulated along the strained section of a xeromorph belt. Thus, a xeromorph power supply having a longer brush could supply more than the 6 microamps generated with only the 1.3" long brush used in these experiments. Appropriate placement of multiple brushes on one xeromorph belt surface allows for commutation of different polarity charges to be utilized. Referring to FIG. 11, and for a particular direction of polarization of the piezo film neutralizing on a curved belt section allows positive polarity charge to be removed on the next flat section. If a neutralization brush is then placed on the flat section after the positive commutation brush, the following curved section will produce negative charge which can be commutated. In a similar set-up, though, one can connect together the two brushes originally going to ground and ground the originally negative commutation brush. This set-up then doubles the magnitude of the positive voltage from the remaining commutation brush relative to that achieved using only one turn of the xeromorph, as shown in FIG. 12. A set-up with n equal changes in strain along the belt could thus provide n times the original 2-brush system voltage, as shown in FIGS. 9 and 10. For example, grounding –V2 will give +4V at –V1 terminal; grounding +V will give –4V at the –V2 terminal.

Figure 7:
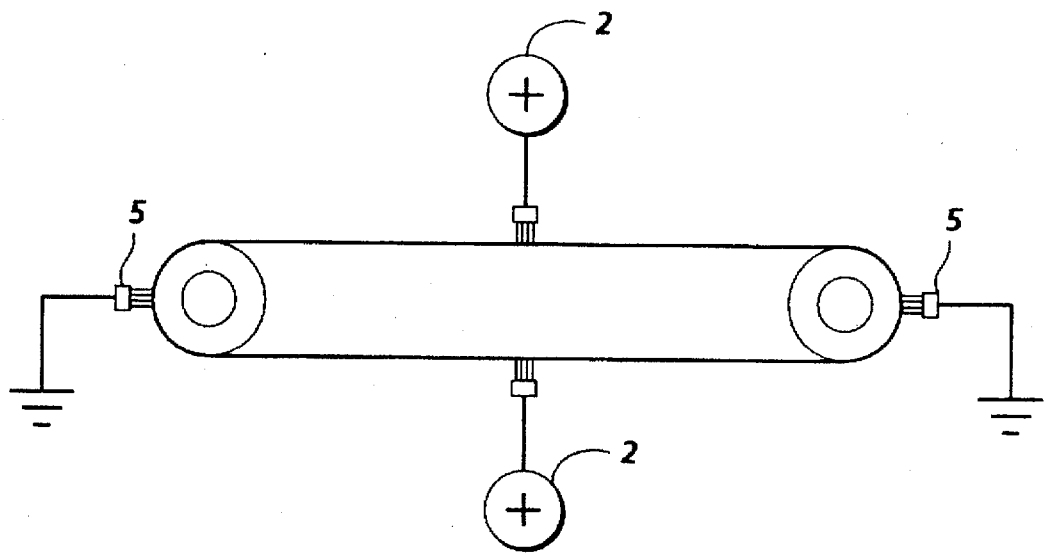
FIG. 7 illustrates double current generations.
Figure 8:
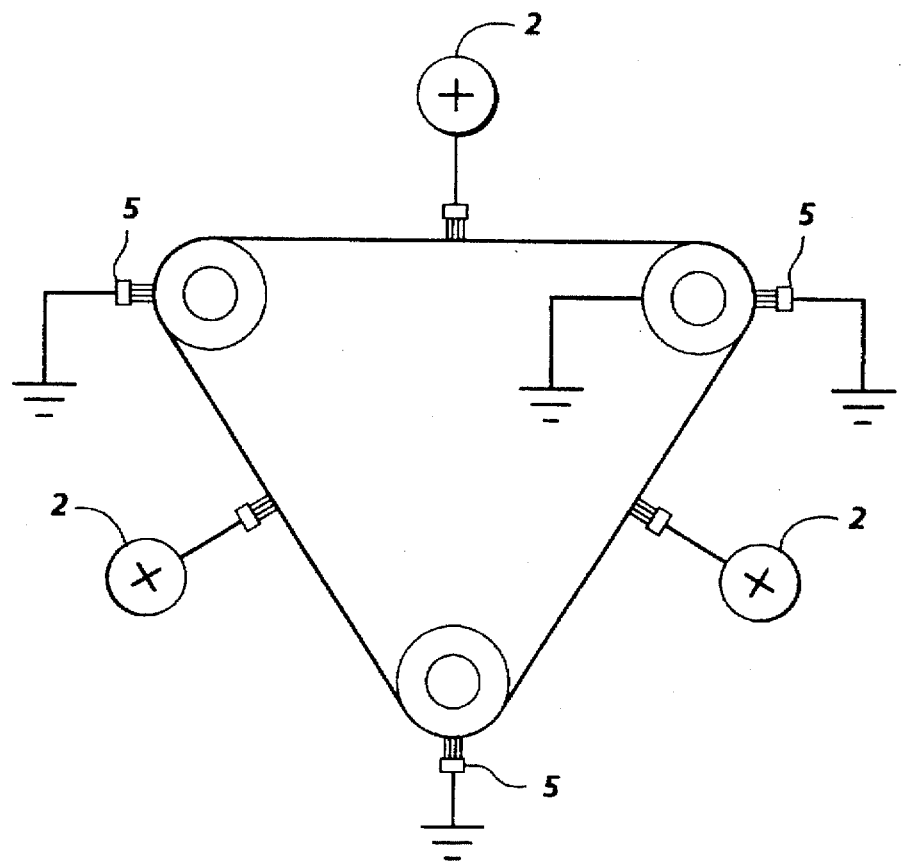
FIG. 8 illustrates triple current generation.

A switch can also be used to turn a neutralization brush into a commutation brush and vice versa, therefore allowing a 2-brush system on one xeromorph to supply both positive and negative charge. One can also "turn off" the xeromorph by neutralizing and commutating On the same type of surface (both curved or both flat sections). The magnitude of charge (current) can also be increased by adding multiple neutralization and commutation brush systems. Referring to FIG. 7, 2 neutralization brushes, 1 on each flat or each curved section, allow for commutation of the same polarity charge on the two sections without neutralization brushes. As well, a triangular belt set-up as shown in FIG. 8 would allow neutralization in even more locations, with triple the charge removed (current) of the same polarity if each like surface contains the same type (commutation or neutralization) brush. Thus, any geometry with n equal changes in strain along the belt could produce n times the original current.

It is, therefore, apparent that there has been provided, in accordance with the present invention, a power supply that fully satisfies the aims and advantages set forth hereinabove. While this invention has been described in conjunction with a specific embodiment thereof, it will be evident to those skilled in the art that many alternatives, modifications, and variations are possible to achieve the desired results. Accordingly, the present invention is intended to embrace all such alternatives, modifications, and variations which may fall within the spirit and scope of the following claims.

We claim:

1. A power supply for transmitting voltage to a device, comprising:
    a web including a piezoelectric exterior layer for generating a voltage on the surface thereof in response to being deformed;
    a member for deforming a portion said web;
    means for transferring the voltage generated on the surface of said piezoelectric exterior layer to the device;
    means for neutralizing the voltage on a portion of the surface of said web; and
    a voltage control, operably associated with said transferring means and neutralizing means, for adjusting the voltage by a set factor to the device.

2. The apparatus of claim 1, wherein said voltage control comprises polarity changing means for changing the polarity of the voltage to the device.

3. The apparatus of claim 1, wherein said member comprises a plurality of rollers, said web being entrained about said plurality of rollers to deform said piezoelectric exterior layer.

4. The apparatus of claim 1, wherein said transferring means includes a plurality of conductive brushes coupled to said web.

5. The apparatus of claim 1, wherein said transferring means includes a conductive roller coupled to said web.

6. The apparatus of claim 1, wherein said neutralizing means comprises a plurality of conductive brushes coupled to said web.

7. The apparatus of claim 1, further comprising means for moving said web at a predetermined velocity in the direction of movement.

8. The apparatus of claim 1, further comprising current adjusting means for adjusting a current level to the device.

9. The apparatus of claim 7, wherein said current adjusting means comprises means, responsive to said moving means, for adjusting the velocity of said web.

10. The apparatus of claim 1, wherein said piezoelectric exterior layer comprises a layer of piezoelectric polymer film.

11. The apparatus of claim 1, wherein said piezoelectric exterior layer comprises:

a first layer of piezoelectric polymer film having a first polarization direction; and a second layer of piezoelectric polymer film having a second polarization direction opposed to the first polarization direction.

12. The apparatus of claim 1, wherein said voltage control comprises a plurality of said transferring means and a plurality of said neutralizing means being positioned along deformed portion of said web and nondeformed of said web.

13. The apparatus of claim 12, further comprising a, and wherein said set factor is a whole number less than or equal to the number of said plurality of said member employed.

* * * * *